3,441,403
RECOVERY OF COPPER VALUES FROM COPPER-CONTAINING ORES

Robert E. Fredrickson, Lake Jackson, Tex., and Albert E. Erhard, Denver, Colo., assignors to The Dow Chemical Company, Midland, Mich., a corporation of Delaware
No Drawing. Filed June 8, 1966, Ser. No. 555,988
Int. Cl. C22b *1/06, 15/00, 3/00*
U.S. Cl. 75—74                                                                    6 Claims

ABSTRACT OF THE DISCLOSURE

This invention relates to an improvement in the process of sulfate roasting of copper-containing ores using $SO_2$ in the presence of $O_2$ (or air) in order to convert the copper values to water-soluble copper sulfate. The present invention increases the efficiency of the copper conversion by the addition of HCl to the $SO_2$ and air during the roasting step.

---

This invention relates to a process for the recovery of copper values from copper-containing ores and more particularly relates to an improved process for converting the water-insoluble copper values in copper ore into a water soluble form.

The present known art provides a process whereby a substantial portion of the copper values present in copper ores as CuS, $CuFeS_2$ and other sulfide minerals of copper, are rendered water-soluble by treatment of the ore with air and $SO_2$ at a temperature of about 400 to about 800° C., preferably about 500 to about 700° C. This method, referred to in the art as sulfate roasting, converts a large portion of the insoluble sulfides of copper contained in such ores to $CuSO_4$ but the extent of conversion is insufficient for the process to be economical for large scale commercial use.

It is an object of this invention, therefore, to provide an improved process for the removal of copper values from copper-containing ores. A further object is to provide an improved process for converting the water-insoluble sulfides of copper contained in copper ore into a water-soluble form. These and other objects and advantages of the present process will become apparent from the following detailed description.

It has now been discovered that in the process of sulfate roasting copper ores with air and $SO_2$, a substantial improvement in the yield of water-soluble copper values is achieved by adding gaseous HCl to the air and $SO_2$ in contact with the copper ore. The improvement provided by this novel process may be achieved by addition of HCl to the air-$SO_2$ mixture during the entire sulfate roasting step or, alternately, HCl may be added to the air-$SO_2$ mixture after a substantial portion of the copper values have been converted to the water-soluble copper sulfate form by the use of the air-$SO_2$ mixture alone. This process is applicable to the same sulfide ores useful in the sulfate roasting process. These ores while generally referred to as sulfide ores normally contain either sulfides, sulfites or carbonates of copper or mixtures thereof, e.g., $CuS_2$, $CuFeS_2$, $Cu_2CO_3$, $CaCO_3 \cdot Cu(OH)_2$, $2CuCO_3 \cdot Cu(OH)_2$, cuprous sulfide, cupric sulfite and the like. Additionally the ores to be treated in the process of this invention include copper-containing ores and mineral concentrates containing insoluble copper values in the form of simple or complex sulfides, sulfites or carbonates and include copper-molybdenum concentrates, rougher copper concentrates, copper ore and the like. Such ores are employed in pulverized or commuinuted form so that the particles present to the treating agent or improved treating agent a relatively high surface to volume ratio.

In general, the gaseous treating agent in the conventional sulfate roasting process contains from about 1 to about 30 volume percent $SO_2$, with the remainder being air. This gaseous treating agent is contacted with a sulfide copper ore at a temperature of from about 400° C. to about 800° C., preferably from about 500° C. to about 700° C., for a period of time ranging from a few minutes to several hours. Such treatment converts the water-insoluble sulfides, sulfites, and carbonates of copper to a water-soluble form, usually some form of $CuSO_4$. The treated ore is then leached with water to remove the water-soluble copper values therefrom.

To achieve the improvement provided by this invention, gaseous HCl is added to the air-$SO_2$ treating agent in a proportion of from about 2 to about 50 volume percent, preferably from about 5 percent to 30 percent. The total HCl contacted with the copper ore is preferably at least 0.1 mole of HCl per mole of sulfide, sulfite or carbonate of copper present but as much as 1.0 mole of HCl per mole or more may be employed if desired. The addition of such HCl to form a gaseous mixture with the air and $SO_2$ of the treating agent produces an improved treating agent which, when contacted with the copper ore at a temperature of from about 400° C. to about 800° C. for a treatment time of from about 0.5 to about 5 hours, with from about 3 to about 4 hours being usually preferred, converts a substantially increased quantity of the copper values therein into a copper sulfate. The improved treating agent containing air, $SO_2$ and HCl, may be employed throughout the entire sulfate roasting step or, alternately, an air-$SO_2$ treating agent may be employed until little or no additional copper values are being converted to copper sulfate and the improved air-$SO_2$-HCl treating agent may then be employed to solubilize additional copper values and thereby raise the total yield of water-soluble copper sulfate to a more economically attractive level.

It is not detrimental for the improved treating agent to additionally contain a relatively inert gas such as nitrogen or argon. If such relatively inert gases are present, however, the relative proportions of air, $SO_2$ and HCl are preferably maintained at the same values as though no inert gas were present. Such inert gases may be added to control flow-rates, temperatures, gas-to-ore ratios and the like.

The following examples are presented to more fully illustrate the invention and are not to be construed as limiting thereto.

EXAMPLE 1

A copper-molybdenum concentrate with a particle size generally between about 10 microns and 250 microns and the following analysis was employed in the following experiments:

|    | Weight percent |
|----|---------------|
| Cu | 8.98 |
| Mo | 2.45 |
| Fe | 12.05 |
| Mg | 2.38 |
| Ca | 1.20 |
| S  | 15.90 |

Gangue and low concentrations of other metals, remainder.

As a control, a 500 gram sample of such concentrate was added to a reactor having a 3 inch diameter. The concentrate was fluidized by the incoming gaseous mixture containing 5 volume percent $SO_2$ and 95 volume percent air and having a flow rate of 13.3 liters/minute. The temperature of the ore was controlled at 600° C. by electric heating. After contacting the ore with the treating agent for a period of about 3 hours, the ore was cooled and leached with water at room temperature by stirring one part by weight of the treated ore with 4 parts by weight of water for one hour, then separating the solids from the leach water. It was found that 85 weight percent of the copper values contained therein had been recovered into the aqueous phase as copper sulfate.

In the same manner, other 500 gram samples of the concentrate were treated at 600° C. for various periods of time with the improved treating agent of this invention containing 30 volume percent HCl and various proportions of SO₂ and air. After this treatment the samples were water leached. Table I, which follows, summarizes the test data and results obtained.

TABLE I

| Run No. | Treating agent (vol. percent) | | | Treating time, min. | Results, wt percent Cu recovered in water leach |
|---|---|---|---|---|---|
| | SO₂ | HCl | Air | | |
| Control | 0 | 30 | 70 | 30 | 88.5 |
| 2 | 3 | 30 | 67 | 30 | 97.6 |
| 3 | 5 | 30 | 65 | 30 | 97.0 |
| 4 | 5 | 30 | 65 | 60 | 97.6 |
| 5 | 5 | 30 | 65 | 120 | 97.5 |
| 6 | 5 | 30 | 65 | 240 | 96.4 |
| 7 | 10 | 30 | 60 | 30 | 96.8 |
| 8 | 15 | 30 | 55 | 30 | 96.5 |

EXAMPLE 2

In the following experiments, a copper sulfide-containing ore was employed which contained 11.27 weight percent copper, 3.04 weight percent molybdenum, 17.38 weight percent sulfur and 0.73 weight percent iron together with gangue and minor amounts of other materials.

A 2000 gram quantity of this material was roasted in air at about 400° C. for about 4 hours and then roasted for an additional one hour at 600° C. in a gaseous treating agent composed of 90 percent air and 10 percent SO₂. The material then was continuously fed to a reactor column at an average feed rate of 190 grams per hour countercurrently to a gas mixture consisting of 65 percent air, 5 percent SO₂, and 30 percent HCl. The temperature in the reactor was maintained at about 600° C. A flow rate of 1 gram HCl for each 3.7 grams Cu was used for 3 hours, then the HCl flow was raised to 1.5 grams/3.7 grams Cu for 2 hours, and finally raised to 2 grams HCl/3.7 grams Cu for the remaining 3 hours. Only the HCl proportion was increased, not the total flow rate. The final gas mixture being fed into the reactor therefore contained 45 percent HCl rather than the original 30 percent. The reactor held about 98 grams of solids and the residence time of the ore therin was about 30 minutes.

After about 30 minutes of operation, a sample was withdrawn and analyzed. Analysis showed that the copper content of the ore being removed from the reactor was 96 percent water-soluble. Subsequent samples taken every 30 minutes showed that from 95 to 100 weight percent of the copper content of the ore was consistently converted to a water-soluble form. An average of the 16 analyses made during 8 hours of continuous operation showed 97.51 weight percent of the copper content of the ore converted to a water-soluble form.

Continuous treatment of the same ore without HCl present converts about 85 weight percent of the copper content of the ore to a water-soluble form.

Various modifications can be made in the present invention without departing from the spirit or scope thereof for it is understood that we limit ourselves only as defined in the appended claims.

We claim:

1. In a process for the sulfate roasting of copper ores wherein copper ore is contacted with a gaseous treating agent of air and SO₂ containing from about 1 to about 30 volume percent SO₂ at a temperature of from about 400° C. to about 800° C., the improvement which comprises adding from about 2 to about 50 volume percent of HCl to the gaseous treating agent in contact with said ore.

2. The process of claim 1 wherein the treating temperature is from about 500 to about 700° C.

3. The process of claim 1 wherein the HCl concentration in the improved treating agent is from about 5 to about 30 volume percent.

4. The process of claim 1 wherein a treatment time of from about 0.5 to about 5 hours is employed.

5. The process of claim 1 wherein the total HCl contacted with the copper ore is at least 0.1 mole of HCl per mole of sulfide, sulfite or carbonate of copper present in said ore.

6. The process of claim 1 wherein HCl comprises from 5 to about 30 volume percent of the treating agent and the time of contact between said treating agent and said ore is from about 0.5 hour to about 5 hours.

References Cited

UNITED STATES PATENTS

| 719,132 | 1/1903 | Payne | 75—110 XR |
| 1,949,928 | 3/1934 | Corson | 23—125 XR |
| 2,357,990 | 9/1944 | Amenabar | 23—135 |
| 3,117,860 | 1/1964 | Bjerkerud, et al. | 75—117 |

L. DEWAYNE RUTLEDGE, *Primary Examiner.*

J. E. LEGRU, *Assistant Examiner.*

U.S. Cl. X.R.

75—72, 110; 23—125